(12) United States Patent
Nonoyama et al.

(10) Patent No.: US 7,037,173 B2
(45) Date of Patent: May 2, 2006

(54) METHOD OF GRINDING

(75) Inventors: Makoto Nonoyama, Kariya (JP); Keita Goto, Kariya (JP); Manabu Kuribayashi, Kariya (JP)

(73) Assignee: Toyota Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/617,053

(22) Filed: Jul. 11, 2003

(65) Prior Publication Data

US 2004/0009741 A1    Jan. 15, 2004

(30) Foreign Application Priority Data

Jul. 12, 2002  (JP) .............................. 2002-203642

(51) Int. Cl.
  *B24B 49/00* (2006.01)
(52) U.S. Cl. .................... 451/5; 451/8; 451/49; 451/62
(58) Field of Classification Search .................. 451/49, 451/62, 5, 8, 9, 10
See application file for complete search history.

(56) References Cited

U.S. PATENT DOCUMENTS

| | | | | |
|---|---|---|---|---|
| 5,529,531 A | * | 6/1996 | Kaiser et al. | 451/307 |
| 5,741,174 A | * | 4/1998 | Kaiser et al. | 451/307 |
| 5,975,995 A | * | 11/1999 | Hykes et al. | 451/62 |
| 6,306,018 B1 | * | 10/2001 | Coverdale et al. | 451/49 |
| 6,409,573 B1 | * | 6/2002 | Mukai et al. | 451/5 |
| 6,419,563 B1 | * | 7/2002 | Ido et al. | 451/57 |

FOREIGN PATENT DOCUMENTS

EP    1 088 621    4/2001

* cited by examiner

*Primary Examiner*—M. Rachuba
(74) *Attorney, Agent, or Firm*—Oblon, Spivak, McClelland, Maier & Neustadt, P.C.

(57) ABSTRACT

A grinding method comprises steps of simultaneously grinding plural grinding portions of a workpiece by plural grinding wheels T1, T2 moved individually each other, and terminating said grinding by a predetermined grinding wheel T1 prior to a termination of said grinding by the other grinding wheel T2. Whereby, a content of the grinding by each grinding wheel T1, T2 can be same. A grinding condition in each grinding by each grinding wheel T1, T2 can be changed in accordance with a measuring result of the grinding portion in the grinding.

5 Claims, 4 Drawing Sheets

METHOD OF GRINDING

INCORPORATION BY REFERENCE

The present application claims priority under 35 U.S.C. §119 to Japanese Patent Application No. 2002-203642, filed on Jul. 12, 2002. The contents of that application are incorporated herein by reference in their entirety.

BACKGROUND OF THE INVENTION

1. Field of the Invention

The invention relates to a grinding method especially for grinding simultaneously plural grinding portions of a workpiece by plural grinding wheels moved individually each other.

2. Description of the Related Art

It is typically known a cylindrical grinding machine having plural grinding wheels individually moved each other to grind simultaneously plural grinding portions of a workpiece. F or example, this technology is disclosed in the U.S. Pat. No. 6,409,573. By the typically known cylindrical grinding machine, as shown in FIG. 1, an individual grinding wheel T1, T2 grinds plural grinding portions K1, K2 of a workpiece W at the same time. Where these kinds of grinding are performed on a plurality of the workpiece W, a termination of a final grinding is different each other in accordance to each workpiece W. The reason of this fact is that a sharpness of cutting grain of the grinding wheel T1, T2 is different, a surface stiffness of the grinding portion K1, K2 of the workpiece is different in each workpiece W, a dimension of the grinding portion K1, K2 are different in each workpiece W, and so on. Especially, it is easily happened that a termination sequence of grindings are different according to each workpiece W, for example, the grinding portion K1 is terminated prior to the termination of the grinding portion K2 in one workpiece and the grinding portion K2 is terminated prior to the termination of the grinding portion K1 in other workpiece.

In a so-called in-process control of the typically known grinding machine where a dimension of the grinding portions of the workpiece is actually measured and the grinding is controlled based on the measured result, even if a grinding condition such as a velocity of grinding infeed is changed during the grinding by each grinding wheel, it is easily also happened that times of terminations of grindings are different according to each workpiece W. FIG. 2 shows a relationship between a grinding wheel position and a time and the position explains an end of the grinding wheel surface so that FIG. 2 shows grinding process according to a moving trace of each grinding wheel. The grinding process has plural processes such as a coarse grinding, an intermediate grinding and a fine grinding. Where the in-process controller controls to transmit the grinding process to a next grinding at the end of each grinding, it appears time difference between the grinding by one grinding wheel (a solid line) and the grinding by the other grinding wheel (a dotted line or a dashed line). Therefore, there happens either a delaying termination (the dashed line) or forward termination (the dotted line) of the other grinding wheel against the termination of said one grinding wheel to make said termination sequence different.

The workpiece, especially a long workpiece intends to be bended on the basis of a stress on the workpiece by a grinding force or a grinding resistance. Because of the difference of the termination of sequence by each grinding wheel, a deflection of the bended workpiece is not stable at each end of final grinding process. For example, in the grinding shown in FIG. 2, next explains in the view point of the grinding by the other grinding wheel. The grinding by the other grinding wheel is terminated prior to the termination by one grinding wheel (see the dashed line) in the stage that the workpiece is largely bended by the grinding resistance of one grinding wheel. However, the grinding by the other grinding wheel is terminated after the termination by one grinding wheel (see the dotted line) in the stage that the grinding resistance of one grinding wheel is released. In above typically known grinding method, because the deflection of the bended workpiece is not stable at the end of final grinding by each grinding wheel, a dispersion of a grinding accuracy of a roundness or a straightness and so on is occurred.

SUMMARY OF THE INVENTION

In view of the previously mentioned circumstances, it is an object of the present invention to provide a grinding method substantially preventing an occurrence of a dispersion of a grinding accuracy.

It is second object of the present invention to provide a grinding method substantially restraining an occurrence of a dispersion of a grinding accuracy in a grinding having the same contents of a grinding.

It is third object of the present invention to provide a grinding method being able to set a suitable grinding condition in each grinding process.

It is another object of the present invention to provide a grinding method maintaining easily a difference of cutting sharpness in each grinding wheel.

It is further object of the present invention to provide a grinding method preventing an unrespectable long grinding time.

It is still further object of the present invention to provide a grinding method making a stable release of a grinding stress after an end of a final grinding process.

In order to achieve the above and other objects, it is one aspect of the present invention to provide a grinding method simultaneously grinding plural grinding portions of a workpiece by plural grinding wheels moved individually each other, and the grinding method comprises a step of terminating said grinding by a predetermined grinding wheel prior to a termination of said grinding by the other grinding wheel. Wherein, "the termination of the grinding" does not mean a time of the termination of the grinding by departing the grinding wheel from contacting with the workpiece but means a time of substantial completion that a removable amount is substantially zero. And also, means for "terminating said grinding by a predetermined grinding wheel prior to a termination of said grinding by the other grinding wheel" is not limited to means explained in Claim 4 or Claim 5 but also is a various way as "a cutting sharpness of the predetermined grinding wheel is better than that of the other grinding wheel in any time", "a removable amount of a grinding portion by the other grinding wheel is larger than that by the predetermined grinding wheel", "a velocity of the grinding feed by the other grinding wheel is later than that by the predetermined grinding wheel" and so on. In this one aspect of the present invention, since the grinding by predetermined grinding wheel is terminated prior to the termination by the other grinding wheel, the workpiece is maintaining in bending by the stress of the grinding portion by the other grinding wheel at the time of termination by the predetermined grinding wheel. At the time of termination by the other grinding wheel, the stress by the other grinding wheel is eliminated in the workpiece every time. Therefore, every workpiece having plural grinding portions has a predictable bending of the grinding portion so that it can provide a grinding method substantially preventing an occurrence of a dispersion of a grinding accuracy.

It is second aspect of the present invention to provide a grinding method wherein each grinding has a same content of the grinding by each grinding wheel. Said "same content of the grinding" means that the grinding is performed in same removable amount of grinding portions to grind said portions to same dimension and it has contents of grindings of the same finishing including a rough fine-grinding, a finish fine-grinding and so on. As explained above, in the typically known cylindrical grinding machine, it is easily happened that a termination of sequence of grindings are different according to each workpiece W in same contents of grinding when plural grinding wheels grind simultaneously plural grinding portions so that a dispersion of a grinding accuracy occurs easily. On the other hand, since the present invention comprises a step of terminating the grinding by the predetermined grinding wheel prior to the termination by the other grinding wheel, it substantially restrains an occurrence of a dispersion of a grinding accuracy to be a useful for the grinding having the same contents.

It is third aspect of the present invention to provide a grinding method wherein the grinding condition of each grinding by each grinding wheel is changed according to a result of measuring grinding portions. Wherein, "the grinding condition" is "a velocity of the grinding feed", "a surface peripheral speed of the grinding wheel", "a rotational speed of the workpiece rotated in a cylindrical grinding machine" and so on in which the present invention may change at least one condition. Said "result of measuring grinding portions" means the result to measure existing states of grinding portions such as a dimension, surface roughness and so on of grinding portions. As explained above, in the typically known cylindrical grinding machine, where the grinding is controlled based on the measured result, it is easily also happened that times of terminations of grindings are different according to each workpiece so that a dispersion of a grinding accuracy occurs easily. On the other hand, since the present invention sets the grinding wheel terminated at first, it can restrict the occurrence of the dispersion of the grinding accuracy to be able to set a suitable grinding condition in each grinding process.

It is fourth aspect of the present invention to provide a grinding method wherein a removable amount of the grinding portion by the predetermined grinding wheel is set less than that by the other grinding wheel in a slower grinding feed velocity of plural grinding processes. In the typically known cylindrical grinding machine, means of the termination by the predetermined grinding wheel prior to that by the other grinding wheel may be (1) the cutting sharpness of the predetermined grinding wheel is better than that of the other grinding wheel, (2) the removable amount of the grinding portion by the predetermined grinding wheel is set less than that by the other grinding wheel or (3) the velocity of the grinding feed of the other grinding wheel is slower than that of the predetermined grinding wheel and so on. However, in said means (1), a state of the difference in cutting sharpness of each grinding wheel is maintained at any time so that the maintenance of each grinding wheel is vague. In said means (2), since the removable amount by the other grinding wheel is larger, a total grinding time becomes large as a whole and a life of the grinding wheel becomes short. In said means (3), the feed velocity of the other grinding wheel is slow so that a quality by the other grinding wheel becomes relatively high needlessly to make the grinding time long. On the other hand, since the grinding method of the present invention has the difference in the removable amount in slower grinding feed velocity, the grinding by the predetermined grinding wheel is terminated at first so that the maintenance of the difference of the cutting sharpness in each grinding wheel is eliminated. Therefore, the grinding by the predetermined grinding wheel is terminated at first without large malfunction by simple means.

It is fifth aspect of the present invention to provide a grinding method wherein the grinding by the other grinding wheel starts a predetermined time after a start by said predetermined grinding wheel. The present invention has a time difference in grindings by the predetermined and the other grinding wheels so that the grinding by the predetermined grinding wheel at first. Therefore, the grinding by the predetermined grinding wheel is terminated at first without large malfunction by simple means as explained above.

It is sixth aspect of the present invention to provide a grinding method wherein the predetermined grinding wheel remains in contact with the grinding portion after the termination of grinding thereof and the predetermined grinding wheel is retracted at first in slow speed at the same time with the other grinding wheel after the termination of the grinding by the other grinding wheel and then in rapid speed. In the present invention, the predetermined and the other grinding wheels are retracted at same time so that it can make a stable release of a grinding stress by each grinding wheel. And also, grinding wheels are retracted at the slow speed at first without rapid speed so that it can make a stable release of a grinding stress too. The retraction speed of the grinding wheel from the workpiece at first is selected from slow grinding feed speed of coarse grinding, intermediate grinding, fine grinding and so on, and is selected normal rapid feed speed in the grinding machine.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DETAILED DESCRIPTION OF THE PREFERRED EMBODIMENTS

A preferred embodiment of a grinding method according to the aforementioned invention will be described referring to FIG. 3 to FIG. 7. The embodiment of the present invention will be described on a cylindrical grinding machine, however it is not limited for the present invention to be applied to the cylindrical grinding machine but it can be applicable to other various grinding machines having plural grinding wheels moved individually each other.

Figure 1:
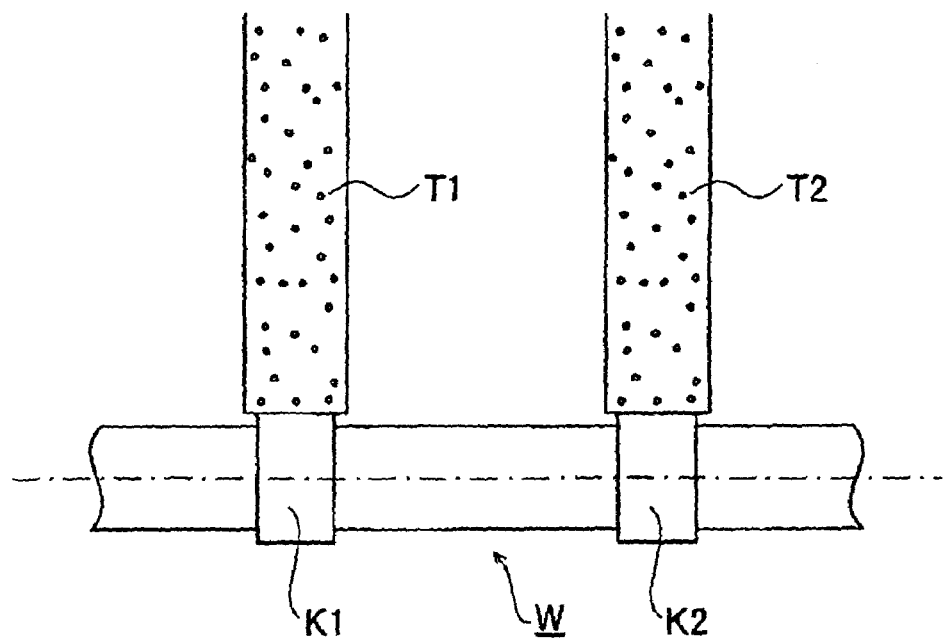
FIG. 1 is a schematic plan view showing a simultaneously grinding of plural grinding portions by plural grinding wheels.
Figure 2:
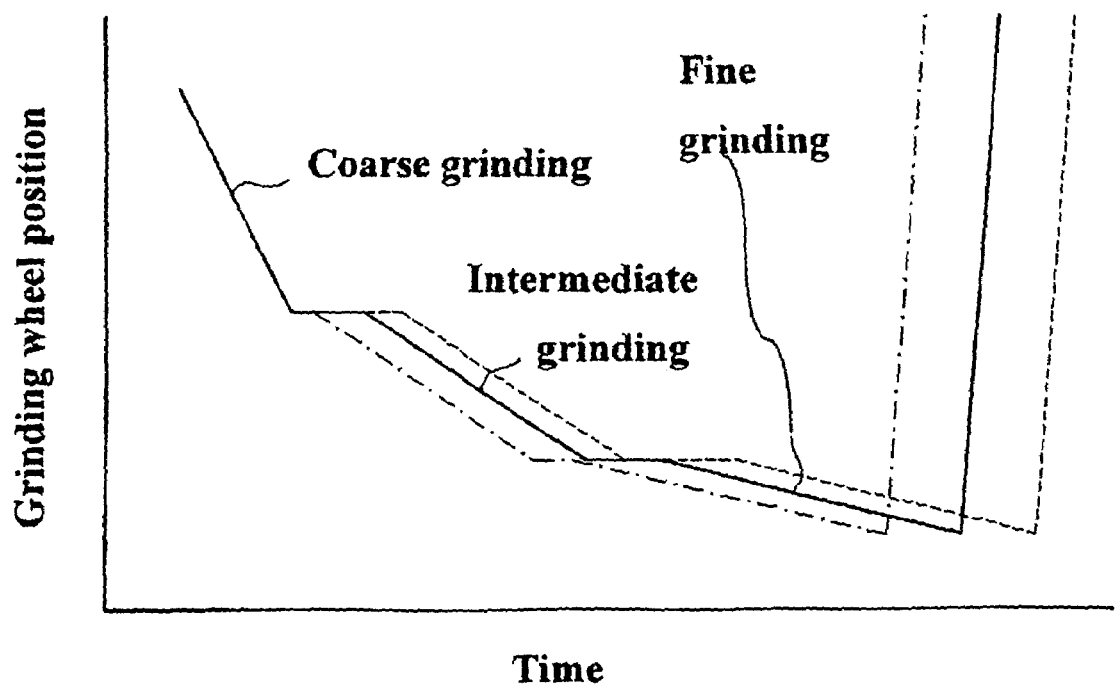
FIG. 2 is a chart showing a conventional grinding process.
Figure 3:
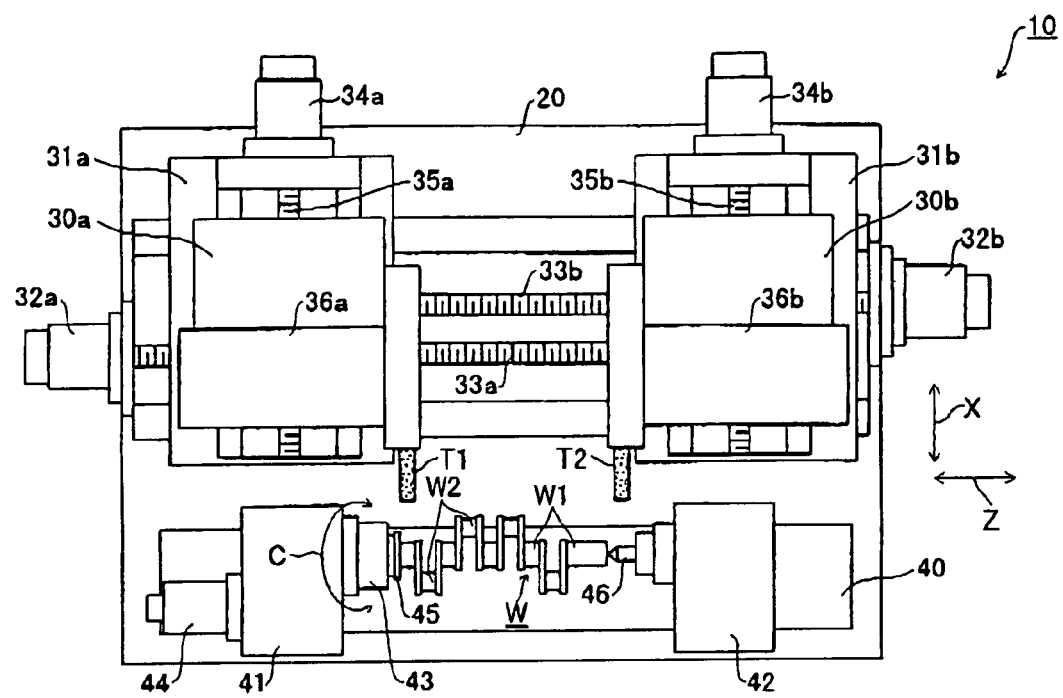
FIG. 3 is a plan view of cylindrical grinding machine for a grinding method of a present invention.

Referring to FIG. 3, a cylindrical grinding machine 10 has a bed 20, two wheel slides 30a, 30b and a table 40 supporting a workpiece W on an upper side of the bed 20. The bed 20 consists of a main flame and said wheel slides 30a, 30b are equipped on left and right upper sides of the bed 20. Each of two supporting table 31a, 31b is slidably mounted on an upper side of the bed 20 in Z-axis direction (shown by an arrow Z) of a longitudinal direction of the workpiece W and each of said wheel slides 30a, 30b is slidably mounted on each upper side of said supporting tables 31a, 31b in X-axis direction (shown by an arrow X) of a radial direction of the workpiece W. Each supporting table 31a, 31b is individually moved through movement transmission mechanism 33a, 33b, such as a feed screw mechanism and so on, by servo motor mechanism 32a, 32b indexing a rotary angle precisely. Each wheel slide 30a, 30b is individually moved through movement transmission mechanism 35a, 35b, such as feed screw mechanism and so on, by servo motor mechanism 34a, 34b indexing a rotary angle precisely. Therefore, each wheel slide is moved in X- and Z-axes directions each other relative to the table 40. Disk-shaped grinding wheels T1, T2 are rotatably mounted in wheel slides 30a, 30b each other to be rotated by drivers 36a, 36b, such as a motor and so on.

The table 40 equips a headstock 41 on its one side and a tailstock 42 on the other side. A main spindle 43 is provided in the headstock 41 to be rotated by a driving mechanism 44, such as servo motor and so on, indexing a rotary angle precisely. The workpiece W is supported on the table 40 to be held on its one side by a chuck 45 mounted on the main spindle 43 and to be forced on its other side by a center 46 mounted on the tailstock 42. The workpiece W is rotated in a C-axis direction (shown by an arrow C) around a center axis of the main spindle 43.

An operation of the present invention is now described hereinafter. The workpiece W is a crankshaft. A grinding portion of the crankshaft is a crank journal W1 or a crankpin W2 to be simultaneously ground by said two grinding wheels T1, T2. In next embodiments, the grinding portion is ground by the way of a plunge-cutting and it can be applicable to the way of a traverse-cutting and so on. The grinding portion is previously cut by a cutting of a lathe or a milling machine to remain a removable amount of successive grinding. Each of grinding portions ground by two grinding wheels T1, T2 has the same removable amount each other to be remained by previous cutting. Each of grinding portions is ground by the present invention to the same profile, same dimension and same surface roughness.

Figure 4:
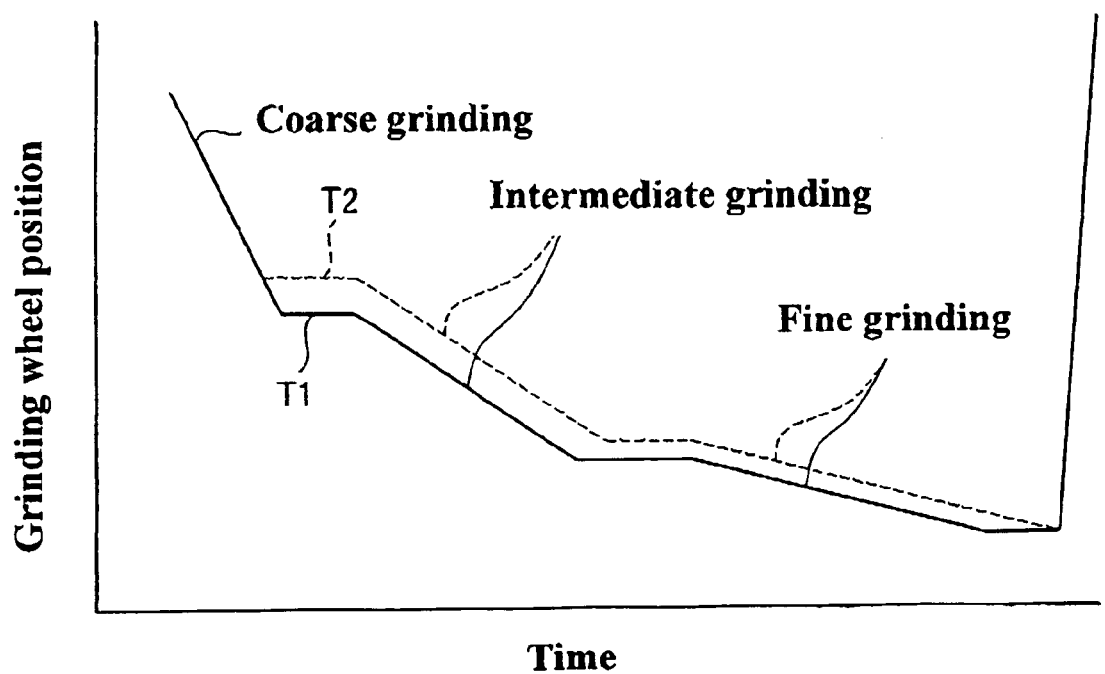
FIG. 4 is chart showing an embodiment of a grinding method of a present invention.

One embodiment of a grinding method of the present invention will be described referring to FIG. 4, a grinding of two grinding wheels T1, T2 consists of plural processes of a coarse grinding, an intermediate grinding and a fine grinding. FIG. 4 shows a relationship between a grinding wheel position and a time and the position explains an end of the grinding wheel surface so that FIG. 4 shows grinding processes according to a moving trace of each grinding wheel T1, T2. In this embodiment, the grinding portion ground by the predetermined grinding wheel T1 is reached to a predetermined dimension before the grinding portion ground by the other grinding wheel T2 is reached to the predetermined dimension, and then the substantial grinding is terminated. The grinding by the predetermined grinding wheel T1 is terminated prior to a termination of the grinding by the other grinding wheel T2.

Each process of grindings is performed by each same grinding wheel T1, T2. A predetermined surface roughness is kept by changing a velocity of grinding feed. In detail, in the coarse grinding the grinding wheels are advanced in a comparatively rapid velocity of the grinding feed and are stopped for a spark out grinding to keep a predetermined dimension and a predetermined surface roughness. In the intermediate grinding, the grinding wheels are advanced in a relatively slower velocity of the grinding feed than the rapid velocity and are stopped for a spark out grinding to keep a predetermined dimension and a predetermined surface roughness. In the fine grinding, the grinding wheels are advanced in a slower velocity of the grinding feed than the velocity in the intermediate grinding and are stopped in order to keep a final predetermined dimension and a final predetermined surface roughness. In the fine grinding, the final predetermined dimension and surface roughness are kept because of substantially slow velocity of the grinding feed. In this embodiment, the spark out grinding of the other grinding wheel T2 is eliminated but the spark out grinding may be performed by the other grinding wheel T2.

The grinding processes are performed by an in-process controller in which a real dimension of the grinding portion is measured in each grinding to control the driving of the wheel slides 30a, 30b by feed-backing the measured dimension. In each grinding process, the driving of each wheel slide 30a, 30b is controlled to transmit to next grinding process at reaching to the predetermined dimension of the grinding portion. In this embodiment, the in-process controller of each grinding by grinding wheels T1, T2 is synchronous in grindings by two wheels T1 and T2 in order to transmit simultaneously to next grinding process as shown in FIG. 4. The removable amount of grinding portion by the grinding wheel T1 is different from the removable amount of grinding portion by the other grinding wheel T2 in certain grinding portions in order to terminate the grinding by the grinding wheel T1 prior to the termination of the grinding by the other grinding wheel T2. These relationships are explained hereinafter.

In the coarse grinding, the removable amount of the grinding portion by the other grinding wheel T2 is less than the removable amount of the grinding portion by the grinding wheel T1 to terminate the coarse grinding by the grinding wheel T2 in a stage that the remaining removable amount of the grinding portion by the other grinding wheel T2 is larger than that by the grinding wheel T1. The grinding wheel T2 is waiting in a stage of the spark out grinding until the termination of the coarse grinding by grinding wheel T1. After terminations of coarse and spark out grindings of each grinding wheel T1, T2 each grinding process by grinding wheels T1, T2 is transmitted to next intermediate grinding.

In the intermediate grinding, it can be set the same removable amount of grinding portion by grinding wheels T1 and T2 In this embodiment, however, the removable amount of grinding by the other grinding wheel T2 is set to be larger than that by the grinding wheel T1 to terminate the intermediate grinding within a stage that the remaining removable amount of grinding portion by the other grinding wheel T2 is still larger than that by the grinding wheel T1 before the fine grinding of the final process. Thereby, a difference between the remaining removable amount of grinding portion by two wheels after the intermediate grinding is smaller than a difference between the same prior to the intermediate grinding so that it restrains the remaining removable amount of grinding portion by the other grinding wheel T2 to be large wastefully in the fine grinding. Because the remaining removable amount of grinding portion by the other grinding wheel T2 is set to be larger than that by the grinding wheel T1, the intermediate grinding by the grinding wheel T1 is terminated prior to that by the other grinding wheel T2. The grinding wheel T1 is waiting in a stage of the spark out grinding until the termination of the intermediate grinding by the other grinding wheel T2. After terminations of intermediate and spark out grindings by each grinding wheel T1, T2 each grinding process by grinding wheels T1, T2 is transmitted to next fine grinding.

In the fine grinding, all remaining removable amount of grinding portion are removed in order to maintain a desirable dimension and surface roughness, because the remaining removable amount of grinding portion by the other grinding wheel T2 is larger than that by the grinding wheel T1 in the fine grinding the grinding portion by the grinding wheel T1 reaches to a predetermined dimension prior to the reach by the other grinding wheel T2. In the fine grinding, the difference between the remaining removable amounts of grinding portion by two grinding wheels T1 and T2 in a beginning of the fine grinding is set to terminate the fine grinding by the grinding wheel T1 prior to the termination by the other grinding wheel T2. Therefore, the grinding by the grinding wheel T1 is terminated prior the termination of the grinding by the other grinding wheel T2 every time in other grinding portion or in other workpiece W.

After the fine grinding by the grinding wheel T1, the wheel slide 30a may be retracted in rapid feed to depart from the workpiece W. In this embodiment, the grinding wheel T1 is remaining in contact with the workpiece W in the spark out grinding until the termination of the fine grinding by the other grinding wheel T2. After the termination of the fine grinding by the other grinding wheel T2, each wheel slide 30a, 30b is retracted at the same time. In the beginning and ending of grindings is by each grinding wheel T1, T2, movement of the wheel slides 30a, 30b is synchronous each other.

In the above-mentioned embodiment, because a transmission to the next grinding process is performed at the same time in grindings by each grinding wheel T1, T2 so that a grinding resistance to the workpiece W by each grinding wheel T1, T2 is stable in each grinding process to make a bending of the long workpiece, such as the crankshaft, stable not only at the ending of grindings but also in the middle of grindings. A dispersion of grinding accuracy is thereby small. And also, because of a synchronously transmission of two grinding wheels to the next step, a rotational speed of the workpiece W can be changed as a grinding condition according to the transmission to the next grinding, thereby to be able to set a suitable grinding condition in each grinding process.

Figure 5:
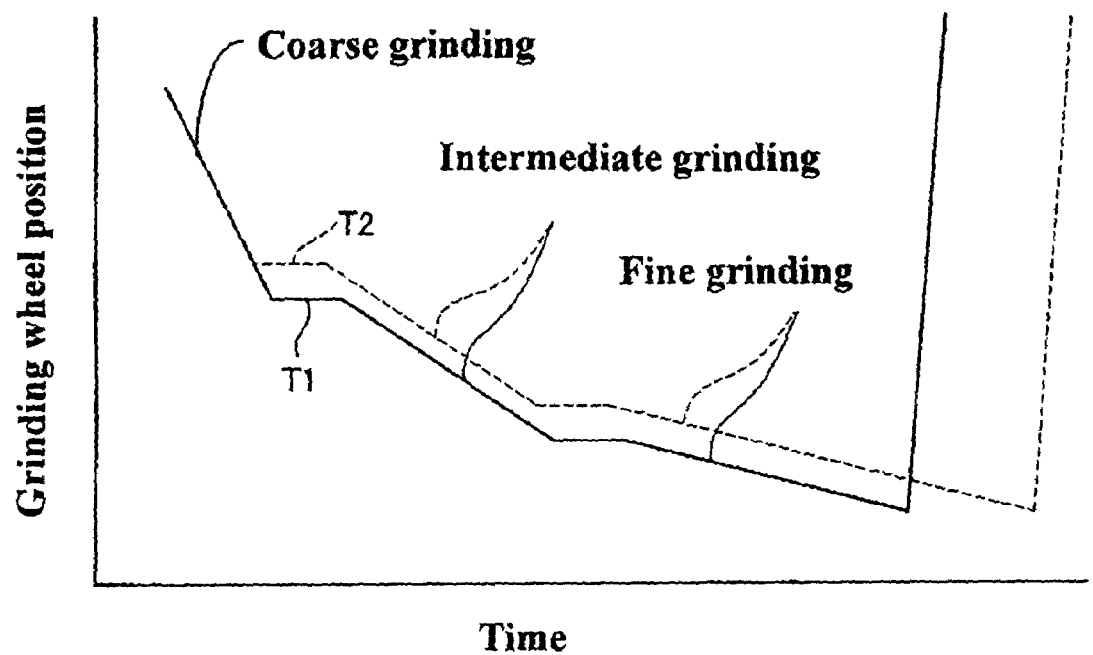
FIG. 5 is chart showing other embodiment of a grinding method of a present invention.

A second embodiment of the present invention will be described referring to FIG. 5 hereinafter. In this embodiment, a grinding by the grinding wheel T1 and a grinding by the other grinding wheel T2 are individually performed by an in-process controller without synchronousness each other. The individual grinding by each grinding wheel T1, T2 is controlled to be transmitted to next grinding process at the end of the coarse grinding, the intermediate grinding and the fine grinding. Referring to FIG. 5, a removable amount of grinding portion by the grinding wheel T1 is set less than a removable amount of grinding portion by the other grinding wheel T2 in the coarse grinding. In the intermediate grinding or the fine grinding in which the velocity of the grinding feed are less than the velocity of the grinding feed in the coarse grinding and a grinding time is longer a grinding time in the coarse grinding, a removable amount of grinding portion by the other grinding wheel T2 in the intermediate grinding or in the fine grinding is larger than a removable amount of grinding portion by the grinding wheel T1. Thereby, every grinding by the grinding wheel T1 in each grinding is terminated prior to the termination by the other grinding wheel T2. On the other way, the grinding by the grinding wheel T1 may be terminated prior to the grinding by the other grinding wheel T2 by the method that the removable amount by two wheels is same in the fine grinding and different in the coarse and intermediate grindings.

Figure 6:
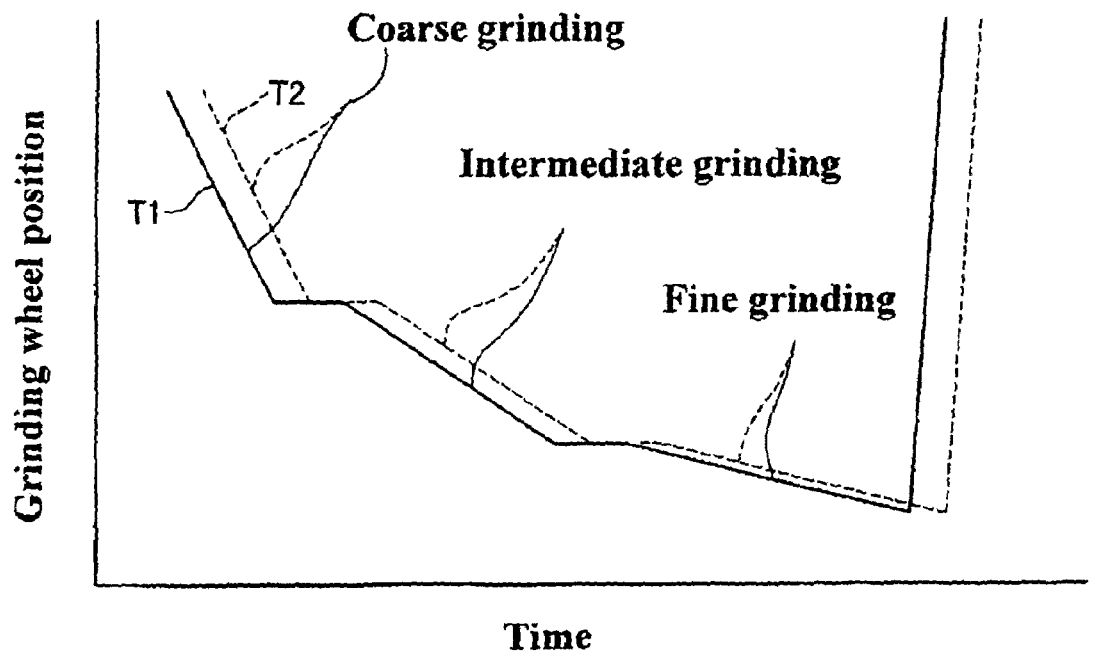
FIG. 6 is chart showing another embodiment of a grinding method of a present invention.

A third embodiment of the present invention will be described referring to FIG. 6. A grinding by the grinding wheel T1 and a grinding by the other grinding wheel T2 are controlled individually by an in-process controller without the synchronousness. A removable amount of the grinding portion by said one grinding wheel is set also same to a removable amount by the other grinding wheel T2 in each of the coarse, the intermediate and the fine grinding, a grinding time by the other grinding wheel T2 delays from a grinding time by one grinding wheel T1 so that the grinding by the grinding wheel T1 is terminated prior to the termination by the grinding wheel T2.

Figure 7:
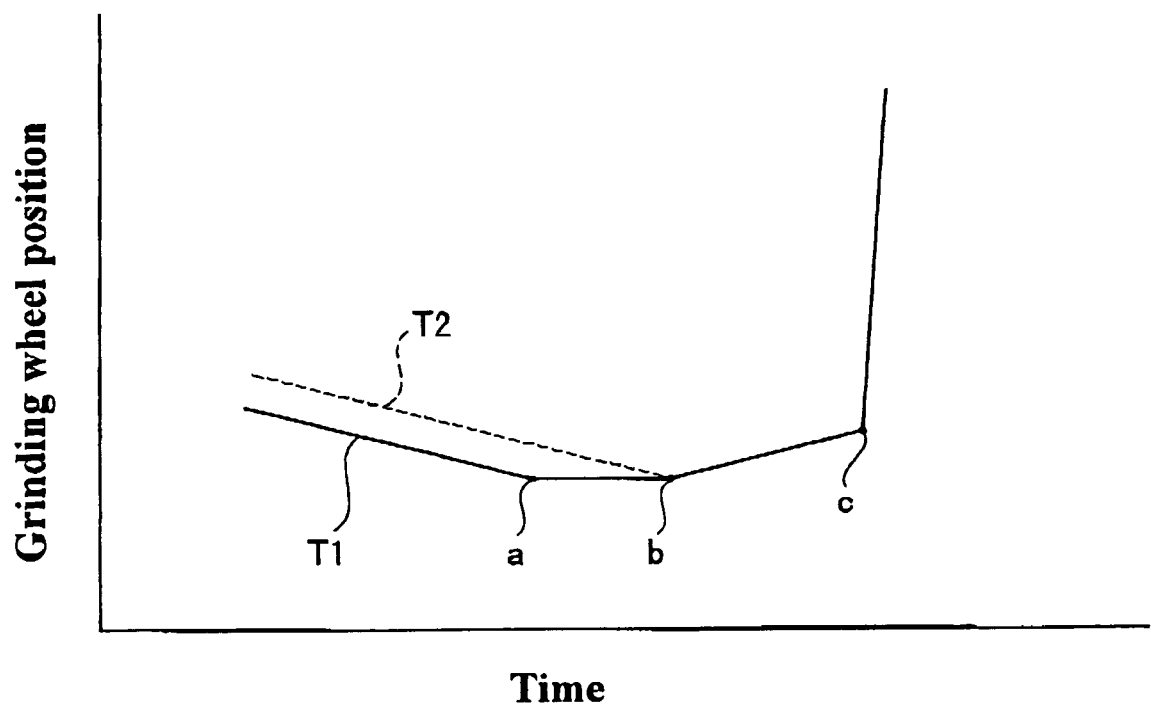
FIG. 7 is chart showing more another embodiment of a grinding method of a present invention.

A fourth embodiment of the present invention will be described referring to FIG. 7. FIG. 7 shows only an end portion of grinding process and the other portion is the same to previous embodiments. After a termination of a fine grinding by the grinding wheel T1 (see a point a in FIG. 7), the grinding wheel T1 remains to contact with the workpiece without retraction immediately and both wheels are retracted at the same time when a fine grinding by the other grinding wheel T2 is terminated (see a point b). A velocity of the retraction of grinding wheels T1 and T2 are slow speed like a grinding feed speed, after passing a point c the velocity are changed to a normal rapid retraction speed.

Obviously, numerous modifications and variations of the present invention are possible in light of the above teachings. It is therefore to be understood that within the scope of the appended claims, the present invention may be practiced otherwise than as specifically described herein. For example, a numerical controller such as a CNC can be used instead of the in-process controller. The above-mentioned means to terminate the grinding by said one grinding wheel prior to the other grinding wheel is combined means making the difference of grinding removable amounts between by said one and by the other grinding wheels with means making the difference of grinding time between of said one and of the other grinding wheels.

What is claimed is:
1. A grinding method comprising the steps of:
providing a plurality of grinding wheels;
selecting a predetermined grinding wheel from the plurality of grinding wheels;
simultaneously grinding plural grinding portions of a workpiece using plural grinding wheels, wherein the step of selecting a predetermined grinding wheel from the plurality of grinding wheels is performed prior to said step of simultaneously grinding plural grinding portions of a workpiece using the plural grinding wheels;
individually controlling each of said grinding wheels during said grinding step; and
controlling said grinding step such that grinding by the predetermined grinding wheel is terminated prior to a termination of grinding by the other grinding wheel, wherein said predetermined grinding wheel remains in contact with said grinding portion after said termination of grinding; and said predetermined grinding wheel is retracted at first in slow speed at the same time with the other grinding wheel after said termination of said grinding by the other grinding wheel and then in rapid speed.

2. A grinding method according to claim 1, wherein said grinding step includes plural grinding portions; and each said grinding portion has the same content for each said grinding wheel.

3. A grinding method according to claim 2, wherein a grinding condition of said each grinding portion by said each grinding wheel is changed according to a result of measuring said grinding portions.

4. A grinding method according to claim 1, wherein said each grinding step by each grinding wheel has plural grinding portions of different velocity of a grinding feed; and a removable amount of said grinding portion by said predetermined grinding wheel is set less than a removable amount of said grinding portion by the other grinding wheel in a slower grinding feed velocity portion of said grinding step.

5. A grinding method according to claim 1, wherein said grinding step by the other grinding wheel starts a predetermined time after a start of said grinding step by said predetermined grinding wheel.

* * * * *